(12) United States Patent
Takeuchi

(10) Patent No.: US 6,934,239 B2
(45) Date of Patent: Aug. 23, 2005

(54) LIGHT SOURCE FOR OPTICAL HEAD

(75) Inventor: Shuichi Takeuchi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 612 days.

(21) Appl. No.: 09/951,454

(22) Filed: Sep. 14, 2001

(65) Prior Publication Data

US 2003/0063551 A1 Apr. 3, 2003

(30) Foreign Application Priority Data

Sep. 20, 2000 (JP) .................................... 2000-284805

(51) Int. Cl.$^7$ ................................................ G11B 7/00
(52) U.S. Cl. .............................. 369/112.01; 369/112.28
(58) Field of Search ........................ 369/112.01, 44.23, 369/44.24, 112.23, 112.28, 112.22

(56) References Cited

U.S. PATENT DOCUMENTS 5,153,768 A   10/1992  Appel
6,088,322 A   7/2000   Broome et al.
6,671,247 B1 * 12/2003  Arai et al. ............. 369/112.01

* cited by examiner

Primary Examiner—Nabil Hindi
(74) Attorney, Agent, or Firm—Greenblum & Bernstein, P.L.C.

(57) ABSTRACT

A light source unit, which is employed in an optical head for an optical disc drive, is provided with a laser diode having a plurality of light emitting points. The plurality of light emitting points are spaced from each other by a predetermined minute amount. One of a plurality of laser beams having different wavelengths is selectively emitted from the plurality of light emitting points. The light source unit further includes a collimating lens that collimates each of the plurality of laser beams respectively emitted from the plurality of light emitting points. The plurality of laser beams passed through the collimating lens proceeds in different directions. The light source unit further includes a transparent optical path compensation element having a predetermined dispersion characteristic. Each of the plurality of laser beams emerging from the collimating lens is emerged from the transparent optical path compensation element along the same optical path.

23 Claims, 4 Drawing Sheets

LIGHT SOURCE FOR OPTICAL HEAD

BACKGROUND OF THE INVENTION

The present invention relates to a light source for an optical head to be employed in an optical disc drive which is capable of read/write data on optical discs according to different standards.

There are a plurality of standards in terms of thickness of a protect layer (a transparent layer covering recording surface) and/or density of recorded data. For example, in a CD (compact disc) or CD-R (CD recordable), the data density of which is relatively low, the thickness of the protect layer is 1.2 mm. In a DVD (digital versatile disc), the data density of which is relatively high, the thickness of the protect layer is 0.60 mm. In order to read/write data on the DVD, the size of a beam spot formed on the data recording surface should be made sufficiently small. For this purpose, a laser beam whose wavelength is relatively short (e.g., 660 nm) should be used. For reading/recording data on the CD-R, in view of the reflectivity characteristics thereof, a laser beam whose wavelength is longer (e.g., 780 nm) should be used.

Therefore, a light source for an optical head which is used for both the DVD and CD-R should be provided with at least two light sources (laser diodes) emitting light beams whose wavelengths correspond to the DVD and CD-R, respectively, and a collimating lens that collimates each of the beams emitted by the at least two laser diodes. Each of the collimated beams is incident on the objective lens. In such a type of the device, if the two laser diodes are independent optical elements, the size of the light source unit becomes too large, which prevents downsizing of the optical head. Accordingly, it is preferable that a multi point emission laser diode be used which is a single element having a plurality of light emission points emitting beams having different wavelengths, respectively.

If the multi point emission laser diode is used, the plurality of light emitting points are spaced from each other in the direction perpendicular to the optical axis. Accordingly, the beams emitted by the respective light emission points and passed through the collimating lens may be different from each other. Therefore, if two light sources for DVD and CD-R are provided, at least one of light beams is incident on the objective lens as an off axial beam. Then, vignetting may occur or a relatively large aberration may occur.

SUMMARY OF THE INVENTION

It is therefore an object of the invention to provide an improved light source for an objective disc drive, in which the direction of the beams are aligned, and occurrence of the vignetting and/or aberrations can be suppressed.

For the object, according to the invention, there is provided a light source unit of an optical head for an optical disc drive. The light source unit selectively emits one of a plurality of laser beams toward an objective lens of the optical head. The light source unit includes a laser diode having a plurality of light emitting points, the plurality of light emitting points spaced from each other by a predetermined minute amount, a plurality of laser beams having different wavelengths being selectively emitted from the plurality of light emitting points, respectively, a collimating lens that collimates each of the plurality of laser beams respectively emitted from the plurality of light emitting points, the plurality of laser beams passed through the collimating lens proceeding in different directions, and a transparent optical path compensation element having a predetermined dispersion characteristic. The optical path compensation element receives each of the plurality of laser beams emerging from the collimating lens and reduces an angle formed between the optical paths of the plurality of laser beams.

With this configuration, the direction of the beams are aligned using the dispersion characteristics of the optical path compensation element, and further, occurrence of the vignetting and/or aberrations can be suppressed.

Preferably, an angle between the optical paths of the plurality of laser beams passed through the optical path compensation element is substantially zero.

Further preferably, the optical paths of the plurality of laser beams passed through the optical path compensation element substantially coincide with each other. For this purpose, the light source unit may be configured such that a light emerging side focal point of the collimating lens is substantially on a light emerging surface of the optical path compensation element.

In one case, the optical path compensation element may include at least one optical element, and a diffraction surface is formed on one of a light receiving surface and a light emerging surface of the at least one optical element.

Optionally, the diffraction surface is represented by an optical path difference function:

$$\phi(y) = P_1 y$$

where, y represents a coordinate perpendicular to the optical axis, and measured along a direction in which the light emitting points $11a$ and $11b$ are aligned, and $P_1$ is a coefficient for a first order term of the optical path difference function.

Further, the diffraction surfaces may preferably be formed to satisfy the following equation:

$$P1 \cdot \lambda B / \{n(\lambda B) - 1\} + \sin \theta \leq 0$$

where, $\lambda B$ is a blazed wavelength measured by millimeter, $n(\lambda B)$ is a refractive index for wavelength $\lambda B$, and $\theta$ represents an inclination angle of the diffraction surface.

The at least one optical element may include a transparent parallel plate.

In this case, the plurality of light emitting points are arranged to be aligned along a line. A longer axis of a cross section of each of the plurality of laser beams may be substantially parallel with the line, and an angle formed between an optical axis of the collimating lens and a normal to a light receiving surface of the parallel plate is smaller than an angle formed between a normal to a light emerging surface of the parallel plate and an optical axis of the objective lens.

Alternatively, the at least one optical element may be at least one prism.

In one example, the plurality of light emitting points and the at least one prism are arranged such that an elliptical cross section of each of the laser beams emitted from the plurality of light emitting points is shaped to be a substantially circular cross section by the at least one prism.

Optionally, the plurality of light emitting points are arranged such that the plurality of laser beams are aligned along the longer axes of the cross section of the plurality of laser beams, and an angle formed between an optical axis of the collimating lens and a normal to a light receiving surface of the at least one prism is smaller than an angle formed between a normal to a light emerging surface of the at least one prism and an optical axis of the objective lens, each of the plurality of laser beams emerging from the light emerging surface of the at least one prism being parallel with the optical axis of the objective lens.

Alternatively, the plurality of light emitting points may be arranged such that the plurality of laser beams are aligned along the shorter axes of the cross section of the plurality of laser beams, and an angle formed between an optical axis of the collimating lens and a normal to a light receiving surface of the at least one prism is greater than an angle formed between a normal to a light emerging surface of the at least one prism and an optical axis of the objective lens, each of the plurality of laser beams emerging from the light emerging surface of the at least one prism being parallel with the optical axis of the objective lens.

In another example, at least one of an angle formed between an optical axis of the collimating lens and a normal to a light receiving surface of the at least one prism and an angle formed between a normal to a light emerging surface of the at least one prism and an optical axis of the objective lens is substantially zero.

Still optionally, the optical path compensation element may include a single prism element. In this case, a diffraction surface is formed on a light receiving surface of the prism element. Further, a beam splitting surface is formed on a light emerging surface of the prism element. The beam splitting surface allows beams passed through the prism element to pass through and reflects at least a part of light beam reflected by the optical disc toward the light receiving element for data readout. The beam splitting surface may be inclined with respect to the optical axis of the objective lens, each of the plurality of laser beams emerging from the light emerging surface of the prism element being parallel with the optical axis of the objective lens.

Further optionally, the optical path compensation element may include a cemented prism consisting of a pair of prism elements cemented to each other. In this case, a diffraction surface may be formed on a light receiving surface of the cemented prism, and a beam splitting surface is formed on a cemented surface of the cemented prism. The beam splitting surface allows beams passed through the prism element to pass through and reflects at least a part of light beam reflected by the optical disc toward the light receiving element for data readout, the beam splitting surface being inclined with respect to the optical axis of the objective lens, each of the plurality of laser beams emerging from the light emerging surface of the cemented prism being parallel with the optical axis of the objective lens.

Alternatively, the optical path compensation element may be configured to include a single prism element, but not to include a diffraction surface.

In this case, the plurality of light emitting points and the prism element may preferably be arranged such that an elliptical cross section of each of the laser beams emitted from the plurality of light emitting points is shaped to be a substantially circular cross section by the prism element.

In a particular case, the plurality of light emitting points are arranged such that the plurality of laser beams are aligned along the longer axes of the cross section of the plurality of laser beams, and an angle formed between an optical axis of the collimating lens and a normal to a light receiving surface of the prism element is smaller than an angle formed between a normal to a light emerging surface of the prism element and an optical axis of the objective lens, each of the plurality of laser beams emerging from the light emerging surface of the prism element being parallel with the optical axis of the objective lens.

Optionally, an angle formed between an optical axis of the collimating lens and a normal to a light receiving surface of the at least one prism is substantially zero.

According to another aspect of the invention, there is provided a light source unit of an optical head for an optical disc drive, which is provided with a laser diode having a plurality of light emitting points, the plurality of light emitting points spaced from each other by a predetermined amount, one of a plurality of laser beams having different wavelengths being selectively emitted from the plurality of light emitting points, respectively, a collimating lens that collimates each of the plurality of laser beams respectively emitted from the plurality of light emitting points, the plurality of laser beams passed through the collimating lens proceeding in different directions, and a transparent optical path compensation element having a predetermined dispersion characteristic so that each of the plurality of laser beams emerging from the collimating lens is emerged from the transparent optical path compensation element along the same optical path.

With this configuration, all the laser beams proceed along the same optical path, and the problem described above is solved.

Optionally, the optical path compensation element may be provided with a beam shaping function. That is, each of the plurality of laser beams emitted by the plurality of light emitting points having an elliptical cross section, while each of the plurality of laser beam emerging from the optical path compensation element having a circular cross section.

Optionally or alternatively, the optical head may include an objective lens, each of the plurality of laser beams emerging from the optical path compensation element being incident on an optical disc through the objective lens, each of the plurality of laser beams reflected by the optical disc being directed toward the optical path compensation element, and the optical path compensation element includes a beam splitting surface that reflects the laser beam reflected by the optical disc and passed through the objective lens to proceed along an optical path extending in a direction different from the same optical path.

DESCRIPTION OF THE ACCOMPANYING DRAWINGS

Hereinafter, light source units respectively according to six embodiments of the invention will be described with reference to the accompanying drawings.

First Embodiment

Figure 1:
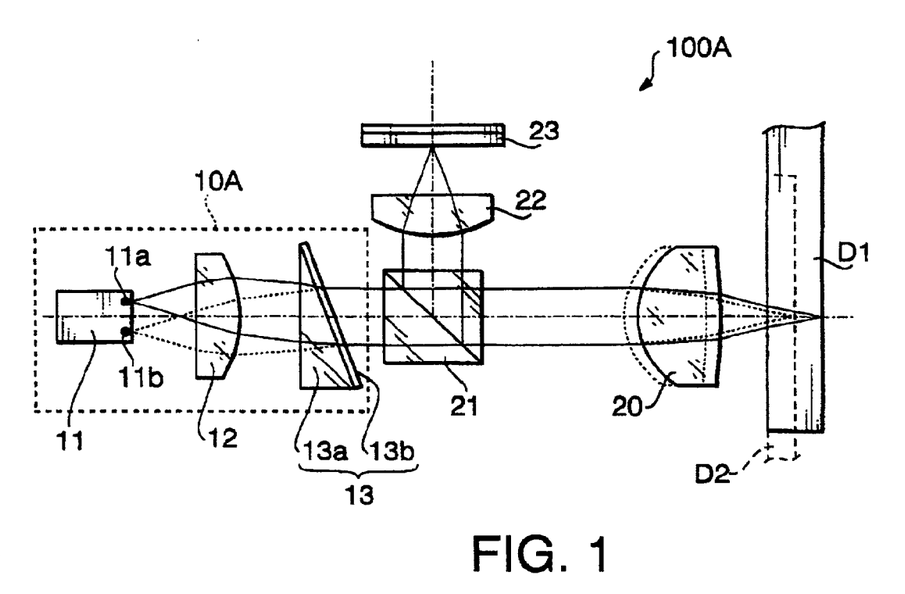
FIG. 1 schematically shows an optical system of an optical head employing a light source unit according to a first embodiment of the invention.

FIG. 1 schematically shows an optical system 100A of an optical head employing a light source unit according to a first embodiment of the invention. The optical head is to be employed in a DVD, CD and CD-R compatible optical data recording/reproducing apparatus.

The optical system 100A shown in FIG. 1 includes a light source unit 10A capable of emitting a light beam having one of two wavelengths in accordance with characteristics of a disc loaded in the apparatus, an objective lens 20 which converges the laser beam emitted by the light source unit 10A onto data recording surfaces of optical discs D1 and D2, a beam splitter 21 which splits the beam reflected by the optical disc, a collecting lens 22 that collects the split light, and an light receiving element 23 that receives light beams collected by the collecting lens 22.

In the following description, a disc having a relatively thick cover layer (e.g., CD and CD-R) will be referred to as a first optical disc D1, and a disc having a relatively thin cover layer (e.g., DVD) will be referred to as a second disc D2. Each disc is to be mounted on a turn table (not shown) and rotated. Thus, regardless of the thickness thereof, a position of the protective cover layer with respect to the optical system 100A is kept constant. On the other hand, a position of the data recording surface, with respect to the optical system 100A, varies depending on the thickness of the protective cover layer.

The light source unit 10A has first and second light emitting points 11a and 11b, which are spaced from each other by a predetermined amount and emit light beams having different wavelengths, a collimating lens 12 which collimates the beams emitted from light emitting points 11a and 11b, and an optical path compensation element 13 which reduces a difference between optical paths of the beams emerging from the collimating lens 12 in different directions. In the configuration shown in FIG. 1, the collimating lens 12 and the objective lens 20 are arranged such that optical axes thereof coincide with each other.

The first light emitting point 11a emits a longer wavelength (785 nm) laser beam, and the second light emitting point 11b emits a shorter wavelength (405 nm or 660 nm) laser beam. The light emitting points 11a and 11b are formed on a single chip spaced by 100 µm.

The optical path compensation element 13 is configured such that a diffractive surface 13b is formed on a light emerging surface of a refraction prism 13a. The optical path compensation element 13 has a predetermined dispersion characteristic with which an angular difference between optical paths of the laser beams emerging from the collimating lens 12 becomes substantially zero degrees. Further, the optical path difference compensation element 13 is arranged such that a light emerging side focal point of the collimating lens 12 is on the light emerging surface thereof. The first and second light emitting points 11a and 11b are on a light incident side focal plane of the collimating lens 12, and light beams respectively emitted by the light emitting points 11a and 11b are collimated thereby and emerge therefrom at different angles. The two collimated beams emerging from the collimating lens 12 intersects at the light emerging side focal point of the collimating lens 12. Therefore, as described above, by arranging the optical path compensation element 13 such that the light emerging side surface thereof coincides with the light emerging side focal point of the collimating lens 12, the angles of the two beams coincide with each other, and further, the optical paths thereof can be made to coincide with each other.

When the first optical disc D1, which is indicated by solid line in the drawings, is used, the laser beam is emitted from the first light emitting point 11a. The laser beam, which has the longer wavelength, emitted by the first light emitting point 11a is collimated by the collimating lens 12. As shown in FIG. 1, the first light emitting point 11a is located on an upper side with respect to the optical axis in the drawing. Therefore, the laser beam emitted by the first light emitting point 11a and passed through the collimating lens 12 is directed toward lower right-hand side in the drawing. The optical path compensation element 13 receives the beam directed to lower right-hand side and emits the same as a beam proceeding in a direction parallel to the optical axis.

The laser beam emitted from the light source unit 10A is incident on the objective lens 20 through the beam splitter 21. The objective lens 20 is located at a position indicated by solid line in FIG. 1 when the first disc D1 is use. That is, when the first disc D1 is used, the objective lens 20 is located closer to the protective layer of the first disc D1. The laser beam incident on the objective lens 20 is converged on the data recording surface of the first disc D1 and forms a beam spot thereon. The laser beam is reflected by the data recording surface, passes through the objective lens 20 and proceeds as a parallel light beam and is incident on the beam splitter 21. A component reflected by the beam splitter 21 is collected by the collecting lens 22 and is converged on the light receiving element 23. The light receiving element 23 is a well-known element having multiple light receiving areas, which outputs signals respectively corresponding to the amounts of light received by the plurality of areas. By processing the output signals, a tracking error signal, a focusing error signal, and a reproducing signal can be generated. It should be noted that, in order to generate the above signals, various optical elements such as a cylindrical lens, a half-wavelength plate, a polarizing beam splitter and the like are employed where necessary.

When the second optical disc D2, which is indicated by broken lines in the drawings, is used, the laser beam is emitted from the second light emitting point 11b. The laser beam, which has the shorter wavelength, emitted by the second light emitting point 11b is collimated by the collimating lens 12. As shown in FIG. 1, the second light emitting point 11b is located on a lower side with respect to the optical axis in the drawing. Therefore, the laser beam emitted by the second light emitting point 11b and passed through the collimating lens 12 is directed toward upper right-hand side in the drawing. The optical path compensation element 13 receives the beam directed to upper right-hand side and emits the same as a beam proceeding in a direction parallel to the optical axis. It should be noted that the optical path of the shorter wavelength beam emitted from the collimating lens 12 coincides with the optical path of the longer wavelength beam emitted from the collimating lens 12.

The laser beam emitted from the light source unit 10A is incident on the objective lens 20 through the beam splitter 21. The objective lens 20 is located at a position indicated by broken lines in FIG. 1 when the second disc D2 is use. That is, when the second disc D2 is used, the objective lens 20 is located farther from the protective layer of the second disc D2 in comparison with the position thereof when the first disc D1 is used. The laser beam incident on the objective lens 20 is converged on the data recording surface of the second disc D2 and forms a beam spot thereon. The laser beam is reflected by the data recording surface, passes through the objective lens 20 and proceeds as a parallel light beam, and is incident on the beam splitter 21. A component reflected by the beam splitter 21 is collected by the collecting lens 22 and is converged on the light receiving element 23.

It should be noted that, in FIG. 1, light rays from both the first and second light emitting points 11a and 11b are shown, and both the first and second disc D1 and D2 are shown. When in use, however, only on of the discs D1 and D2 is used, and one of the light emitting points 11a and 11b is used depending on the used disc.

As described above, according to the first embodiment, by arranging the optical path compensating element 13, the optical paths of the longer and shorter wavelength beams are made parallel to the optical axis, and coincident with each other. Therefore, the occurrence of the vignetting and/or aberrations due to oblique incident angle of the beams with respect to the objective lens 20 is avoided.

Hereinafter, the optical path compensating element 13 will be described in detail.

The diffraction surface 13b is represented by an optical path difference function (1) below.

$$\phi(y) = P_1 \cdot y \tag{1}$$

where, $\phi(y)$ represents an additional optical path length at position y, y being a coordinate perpendicular to the optical axis, and measured along a direction in which the light emitting points 11a and 11b are aligned, and P1 is a coefficient (first order).

The diffraction surface 13b represented by function (1) has a refractive power of a prism. Accordingly, the diffraction surface 13b does not diverge or converge the laser beams emitted by the light emitting points 11a and 11b, and only the direction in which the laser beam proceeds can be changed.

As the wavelength is shorter, a Refractive index of the refraction prism 13a increases and therefore an angle of deviation increases. Accordingly, in order to make the directions of the laser beams coincide with each other, each of the laser beams should be bent on the second light emitting point 11b side. In other words, the prism 13a should have its apical angle on the first light emitting point 11a side. The diffraction surface 13b has a dispersion characteristic which is opposite to that of the prism. That is, the diffraction angle increases as the wavelength is longer. In order to introduce the laser beams in the same direction, they should be bent in the first light emitting point 11a side. Given that a direction in which the light emitting points 11a and 11b are aligned is referred to as y axis, that the center between the light emitting points 11a and 11b is the origin point, and that the first light emitting point 11a side is a positive side and the second light emitting point 11b side is a negative side, then the optical path difference coefficient P1 should be positive in order to bend the laser beams in the first light emitting point 11a side.

As described above, when the optical path compensation element 13 includes the prism 13a and the diffraction surface 13b, they bend the laser beams in the opposite directions in order to align both beams. Therefore, by distributing the dispersion powers appropriately in the prism 13a and the diffraction surface 13b, it becomes possible to make the optical axes of the collimating lens 12 and the objective lens 20 parallel with each other. Further, both optical axes can be coincident with each other as shown in FIG. 1. Therefore, the arrangement of the optical elements can be simplified.

Furthermore, according to the first embodiment, an angle formed between the optical axis of the collimating lens 12 and a normal to an light receiving surface of the optical path compensation element 13 is zero, positioning of the optical path compensation element 13 can be performed easily with reference to the optical axis of the collimating lens 12. Still further, by combining the prism 13a with the diffraction surface 13b function as a prism, the apical angle of the prism 13a can be made small, which enables downsizing of the optical path compensation element 13.

It should further be noted that, the laser beam emitted from each light emitting point is a diverging beam having an elliptical cross section, and, in the first embodiment, the light emitting points 11a and 11b are aligned in a direction of a longer axis of the elliptical cross section of each beam. Further, an angle formed between the optical axis of the collimating lens 12 and a normal to the light receiving surface of the optical path compensation element 13 is smaller than the angle formed between a normal to the light emerging surface of the optical path compensation element 13 and the optical axis of the objective lens 20.

The beams emitted by the laser diode 11 are diverging beams, and the diverging angles are different depending on directions. Therefore, the elliptical cross section of each laser beam should be compensated to a circular shape. Generally, the compensation is given by a prism. In the above-described embodiment, by arranging the optical path compensation element 13 in accordance with the cross sectional shape of the laser beams, the compensation function is provided by the prism 13a.

Five exemplary designs of the optical path compensation element will be indicated in TABLEs 1–5. In each TABLE, an inclination angle θ of the diffraction surface represents an angle formed between a normal to a plane that is a macroscopic shape of the diffraction surface 13b and the optical axis of the objective lens 20. The sign of the inclination angle θ is defined such that the inclination angle θ is positive when the normal (on the object lens side) is inclined, with respect to the optical axis of the objective lens 20, in the second light emitting point 11b side (i.e., a clockwise direction in FIG. 1).

TABLE 1

| | |
|---|---|
| wavelength λ1 of the beam emitted by the first light emitting point 11a | 785 nm |
| wavelength λ2 of the beam emitted by the second light emitting point 11b | 660 nm |
| blazed wavelength λB for the diffraction surface 13b | 785 mm |
| distance between the light emitting points 11a and 11b | 0.100 mm |
| focal length of the collimating lens 12 | 8.00 mm |
| refractive indexes n(λ1) and n(λ2) of the prism 13a for wavelengths λ1 and λ2 | n(λ1) = 1.537<br>n(λ2) = 1.540 |
| apical angle of the prism 13a | 7.3457° |
| optical path difference coefficient P1 | 9.530 × 10 |
| inclination angle θ of the diffraction surface 13b | −7.3457° |

TABLE 2

| | |
|---|---|
| wavelength $\lambda 1$ of the beam emitted by the first light emitting point 11a | 785 nm |
| wavelength $\lambda 2$ of the beam emitted by the second light emitting point 11b | 405 nm |
| blazed wavelength $\lambda B$ for the diffraction surface 13b | 785 nm |
| distance between the light emitting points 11a and 11b | 0.100 mm |
| focal length of the collimating lens 12 | 8.00 mm |
| refractive indexes $n(\lambda 1)$ and $n(\lambda 2)$ of the prism 13a for wavelengths $\lambda 1$ and $\lambda 2$ | $n(\lambda 1) = 1.537$ $n(\lambda 2) = 1.560$ |
| apical angle of the prism 13a | 1.9441° |
| optical path difference coefficient P1 | 3.115 × 10 |
| inclination angle $\theta$ of the diffraction surface 13b | −1.9441° |

TABLE 3

| | |
|---|---|
| wavelength $\lambda 1$ of the beam emitted by the first light emitting point 11a | 785 nm |
| wavelength $\lambda 2$ of the beam emitted by the second light emitting point 11b | 660 nm |
| blazed wavelength $\lambda B$ for the diffraction surface 13b | 723 nm |
| distance between the light emitting points 11a and 11b | 0.100 mm |
| focal length of the collimating lens 12 | 8.00 mm |
| refractive indexes $n(\lambda 1)$, $n(\lambda 2)$ and $n(\lambda B)$ of the prism 13a for wavelengths $\lambda 1$, $\lambda 2$ and $\lambda B$ | $n(\lambda 1) = 1.537$ $n(\lambda 2) = 1.540$ $n(\lambda B) = 1.538$ |
| apical angle of the prism 13a | 7.3480° |
| optical path difference coefficient P1 | 9.533 × 10 |
| inclination angle $\theta$ of the diffraction surface 13b | −7.3480° |

TABLE 4

| | |
|---|---|
| wavelength $\lambda 1$ of the beam emitted by the first light emitting point 11a | 785 nm |
| wavelength $\lambda 2$ of the beam emitted by the second light emitting point 11b | 660 nm |
| blazed wavelength $\lambda B$ for the diffraction surface 13b | 785 nm |
| distance between the light emitting points 11a and 11b | 0.100 mm |
| focal length of the collimating lens 12 | 8.00 mm |
| refractive indexes $n(\lambda 1)$ and $n(\lambda 2)$ of the prism 13a for wavelengths $\lambda 1$ and $\lambda 2$ | $n(\lambda 1) = 1.824$ $n(\lambda 2) = 1.836$ |
| apical angle of the prism 13a | 4.6059° |
| optical path difference coefficient P1 | 9.227 × 10 |
| inclination angle $\theta$ of the diffraction surface 13b | −4.6059° |

TABLE 5

| | |
|---|---|
| wavelength $\lambda 1$ of the beam emitted by the first light emitting point 11a | 785 nm |
| wavelength $\lambda 2$ of the beam emitted by the second light emitting point 11b | 660 nm |
| blazed wavelength $\lambda B$ for the diffraction surface 13b | 722 nm |
| distance between the light emitting points 11a and 11b | 0.100 mm |
| focal length of the collimating lens 12 | 8.00 mm |
| refractive indexes $n(\lambda 1)$, $n(\lambda 2)$ and $n(\lambda B)$ of the prism 13a for wavelengths $\lambda 1$, $\lambda 2$ and $\lambda B$ | $n(\lambda 1) = 1.537$ $n(\lambda 2) = 1.540$ $n(\lambda B) = 1.538$ |
| apical angle of the prism 13a | 7.3460° |
| optical path difference coefficient P1 | 9.530 × 10 |
| inclination angle $\theta$ of the diffraction surface 13b | −7.3460° |

The diffraction surface 13b is preferably formed by an injection molding process. A mold for the diffraction surface 13b is formed by cutting the surface thereof using a diamond bit. In order to facilitate manufacturing of such a molding, condition (2) is preferably satisfied.

$$P1 \cdot \lambda B / \{n(\lambda B) - 1\} + \sin \theta \leq 0 \quad (2)$$

where, $\lambda B$ represents the blazed wavelength (unit: mm), $n(\lambda B)$ represents the refractive index for the blazed wavelength, and $\theta$ represents the inclination angle (unit: radian) of the diffraction surface.

When condition (2) is satisfied, a microscopic shape of the diffraction surface, which includes stepped surfaces, does not have surfaces forming an acute angle, and the manufacturing errors can be decreased.

Figure 7A:
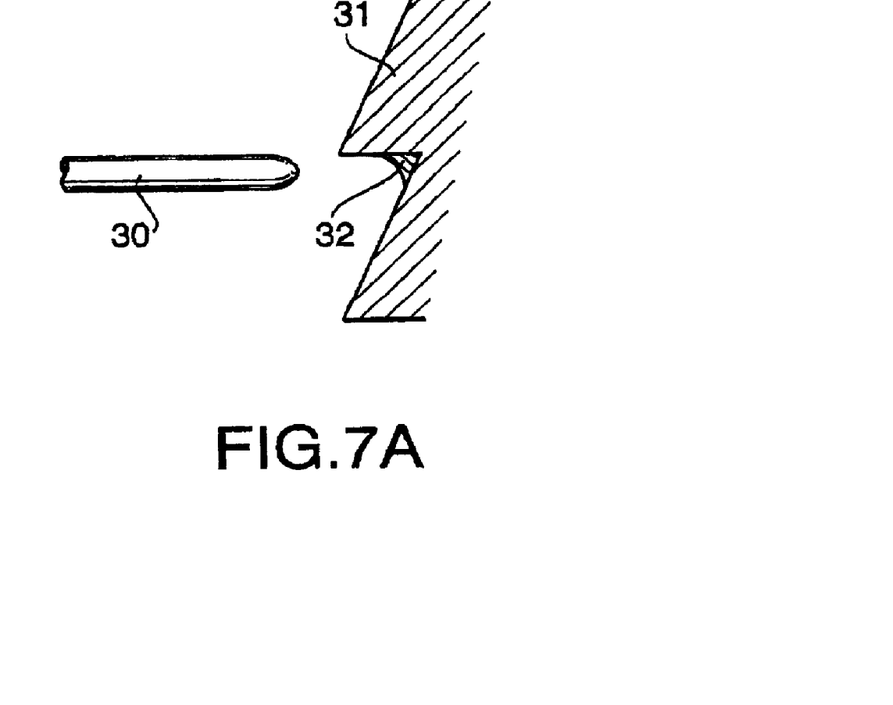
FIGS. 7A and 7B illustrate manufacturing error depending on a microscopic shape of a diffraction surface.
Figure 7B:
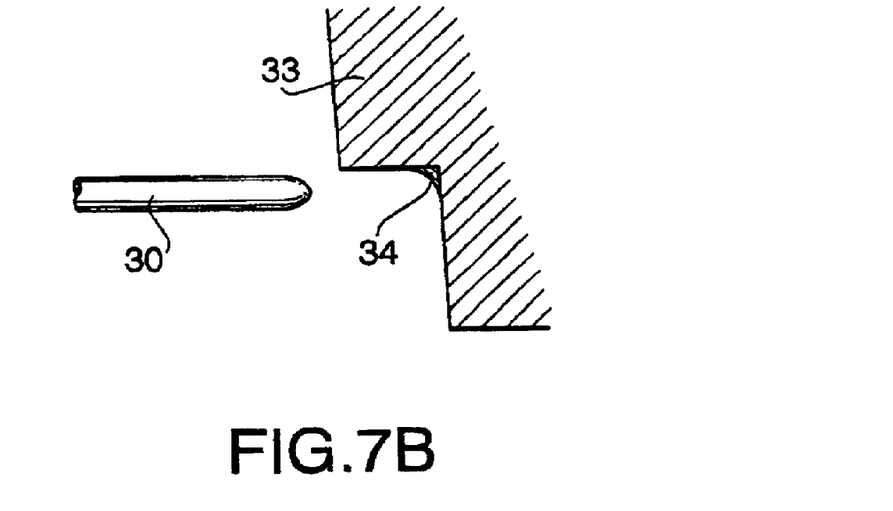

FIG. 7A shows a structure of a diffraction surface including surfaces forming an acute angle. As shown in FIG. 7A, the tip of the bit 30 has a hemispherical surface. If the mold 31 is to be formed with such surfaces forming the acute angle, a relatively large non-cut portion 32 remains as shown in FIG. 7A. FIG. 7B shows a structure in which a mold 33 does not have surfaces forming an acute angle. In such a structure, a non-cut portion 34 is relatively small. Thus, if condition (2) is satisfied, diffraction efficiency is improved, and loss of light by the diffraction surface 13b is reduced.

Among the five exemplary designs, the third and fifth examples satisfy condition (2).

According to the third example (TABLE 3), $$P1 \cdot \lambda B / \{n(\lambda B) - 1\} + \sin \theta = (9.1533 \times 10) \cdot (723 \times 10^{-6}) / (1.538 - 1) +$$

$$\sin(-0.128 \text{ [rad]})$$

$$= 0.128 + (-0.128)$$

$$= 0.0$$

According to the fifth example (TABLE 5), $$P1 \cdot \lambda B / \{n(\lambda B) - 1\} + \sin \theta = (9.1530 \times 10) \cdot (722 \times 10^{-6}) / (1.538 - 1) +$$

$$\sin(-0.128 \text{ [rad]})$$

$$= 0.128 + (-0.128)$$

$$= 0.0$$

As above, each of the third and fifth examples satisfies condition (1). Therefore, if the mold is formed in accordance with the third or fifth design, manufacturing error of the mold can be suppressed, and loss of light by the diffraction surface 13b can be suppressed.

Second Embodiment

Figure 2:
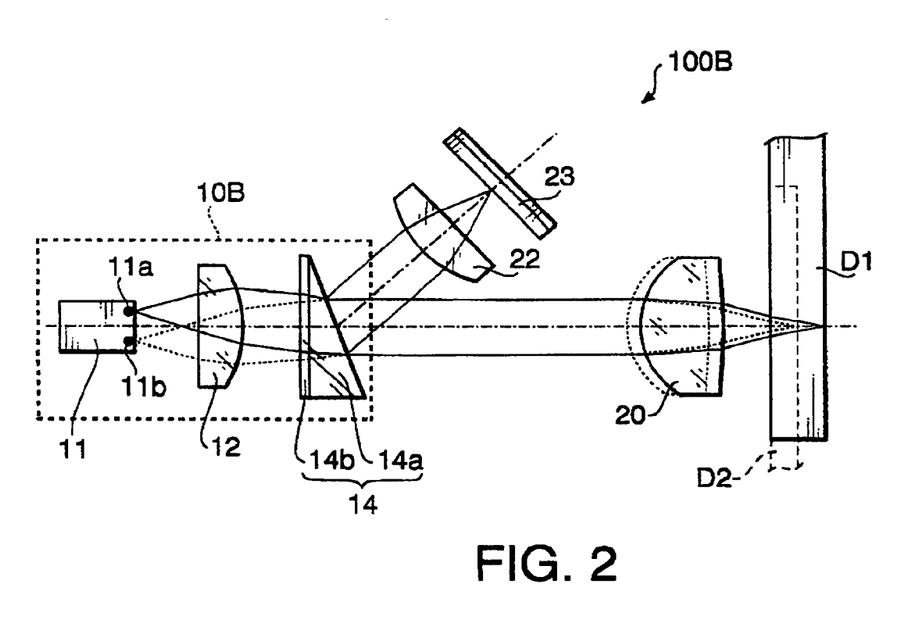
FIG. 2 schematically shows an optical system of an optical head employing a light source unit according to a second embodiment of the invention.

FIG. 2 shows a optical system 100B of an optical head including a light source unit 10B according to a second embodiment.

The optical system 100B includes the light source unit 10B, an objective lens 20, a collective lens 22 and a light receiving element 23. The light source unit 10B includes a laser diode 11 having multiple light emitting points, a collimating lens 12, an optical path compensation element 14 composed of a refraction prism 14a and a diffraction surface 14b. The configuration of the optical system 100B is substantially similar to that of the optical system 100A shown in FIG. 1 except that the diffraction surface 14b is formed on a light incident side of the optical path compensation element 14, a beam splitter is omitted, and the light emerging surface of the optical path compensation element 14 serves as a beam splitting surface, which inclines with respect to the optical axis of the objective lens 20.

The laser beams emitted by the light emitting points 11a and 11b are collimated by the collimating lens 12, and are incident on the optical path compensating element 14. The optical path compensating element 14 bends the laser beams such that each of the beams proceeds in a direction parallel to the optical axis of the objective lens 20. Further, the optical paths of the beams emerging from the optical path compensation element 14 coincide with each other. Each of the laser beams emerging from the optical path compensation element 14 is incident on the objective lens 20, which converges the laser beams on the data recording surface of the first or second disc D1 or D2 to form a beam spot thereon. The beam reflected by the data recording surface passes through the objective lens, and proceeds as a parallel light beam toward the optical path compensation element 14. Part of the reflected light incident on the optical path compensation element 14 is reflected by the light emerging surface thereof, which is incident on the light receiving element 23 through the collective lens 22.

As described above, according to the second embodiment, the optical path of the laser beams having different wavelengths can be coincident with each other, thereby vignetting at the objective lens 20 and/or occurrence of aberrations can be suppressed. Further, the optical axes of the collimating lens 12 and the objective lens 20 can be made coincide with each other. Therefore, arrangement of the lenses can be facilitated. Furthermore, according to the second embodiment, since the light emerging surface of the optical path compensation element 14 is used as the beam splitting surface, a beam splitter employed in the first embodiment can be omitted. Thus, the number of parts can be reduced.

Similarly to the first embodiment, the light emitting points 11a and 11b are aligned in a direction of a longer axis of the elliptical cross section of each beam. Further, an angle formed between the optical axis of the collimating lens 12 and a normal to the light receiving surface of the optical path compensation element 14 is smaller than the angle formed between a normal to the light emerging surface of the optical path compensation element 14 and the optical axis of the objective lens 20, so that a beam shaping function is provided (i.e., the elliptical cross section of each laser beam is compensated to a circular shape).

An exemplary design of the optical path compensation element 14 according to the second embodiment will be indicated in TABLE 6. In the TABLE, an inclination angle θ of the diffraction surface represents an angle formed between a normal to a plane that is a macroscopic shape of the diffraction surface 14b and the optical axis of the objective lens 20. The sign of the inclination angle θ is defined such that the inclination angle θ is positive when the normal (on the collimating lens side) is inclined, with respect to the optical axis of the objective lens 20, in the second light emitting point 11b side (i.e., a counterclockwise direction in FIG. 2).

TABLE 6

| | |
|---|---|
| wavelength λ1 of the beam emitted by the first light emitting point 11a | 785 nm |
| wavelength λ2 of the beam emitted by the second light emitting point 11b | 660 nm |
| blazed wavelength λB for the diffraction surface 14b | 785 nm |
| distance between the light emitting points 11a and 11b | 0.100 mm |
| focal length of the collimating lens 12 | 8.00 mm |
| refractive indexes n(λ1) and n(λ2) of the prism 14a for wavelengths λ1 and λ2 | n(λ1) = 1.537 n(λ2) = 1.540 |

TABLE 6-continued

| | |
|---|---|
| apical angle of the prism 14a | 7.3694° |
| optical path difference coefficient P1 | 9.612 × 10 |
| inclination angle θ of the diffraction surface 14b | 0.0000° |

Third Embodiment

Figure 3:
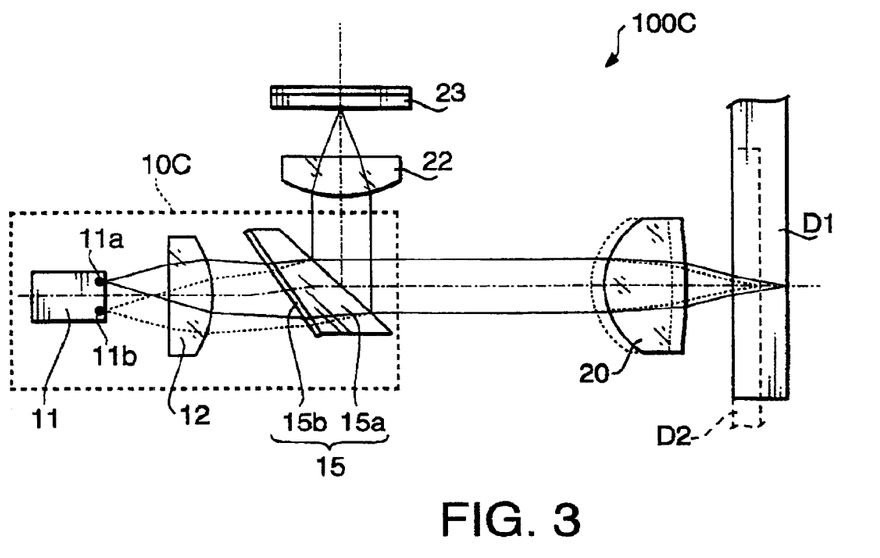
FIG. 3 schematically shows an optical system of an optical head employing a light source unit according to a third embodiment of the invention.

FIG. 3 shows a optical system 100C of an optical head including a light source unit 10C according to a third embodiment.

The optical system 100C includes the light source unit 10C, an objective lens 20, a collective lens 22 and a light receiving element 23. The light source unit 10C includes a laser diode 11 having multiple light emitting points, a collimating lens 12, an optical path compensation element 15 composed of a refraction prism 15a and a diffraction surface 15b. A difference of the configuration of the optical system 100C with respect to the optical system 100B according to the second embodiment is that a normal to a light receiving surface of the optical path compensation element 15 is inclined with respect to the optical axis of the collimating lens 12, and that a light emitting surface of the optical path compensation element 15 is inclined with respect to the optical axis of the objective lens 20 at 45 degrees. Since the light receiving surface is inclined, the central axis of the laser beam parallely shifts in a direction perpendicular to the optical axis of the collimating lens 12. In accordance with the shift of the beam, the objective lens 20 is arranged such that its optical axis is shifted parallely with respect to the optical axis of the collimating lens 12 in the direction perpendicular to the optical axis thereof.

As described above, according to the third embodiment, the optical path of the laser beams having different wavelengths can be coincident with each other, thereby vignetting at the objective lens 20 and/or occurrence of aberrations can be suppressed. Further, according to the third embodiment, since the light emerging surface of the optical path compensation element 15 is used as the beam splitting surface, a beam splitter employed in the first embodiment can be omitted. Thus, the number of parts can be reduced.

Furthermore, since the beam splitting surface is inclined with respect to the optical axis of the objective lens by 45 degrees, it is possible to arrange the collective lens 22 such that its optical axis is perpendicular to the optical axis of the objective lens 20. With such a configuration, positioning of the collective lens 22 and the light receiving element 23 can be performed easily with reference to the optical axis of the objective lens 20.

Similarly to the first embodiment, the light emitting points 11a and 11b are aligned in a direction of a longer axis of the elliptical cross section of each beam. Further, an angle formed between the optical axis of the collimating lens 12 and a normal to the light receiving surface of the optical path compensation element 15 is smaller than the angle formed between a normal to the light emerging surface of the optical path compensation element 15 and the optical axis of the objective lens 20, so that a beam shaping function is provided (i.e., the elliptical cross section of each laser beam is compensated to a circular shape) by the prism 15a.

An exemplary design of the optical path compensation element 15 according to the third embodiment will be indicated in TABLE 7.

TABLE 7

| | |
|---|---|
| wavelength λ1 of the beam emitted by the first light emitting point 11a | 785 nm |
| wavelength λ2 of the beam emitted by the second light emitting point 11b | 660 nm |
| blazed wavelength λB for the diffraction surface 15b | 785 nm |
| distance between the light emitting points 11a and 11b | 0.100 mm |
| focal length of the collimating lens 12 | 8.00 mm |
| refractive indexes n(λ1) and n(λ2) of the prism 15a for wavelengths λ1 and λ2 | n(λ1) = 1.537<br>n(λ2) = 1.540 |
| apical angle of the prism 15a | 4.6170° |
| optical path difference coefficient P1 | 7.344 × 10 |
| inclination angle θ of the diffraction surface 15b | 40.3830° |

Fourth Embodiment

Figure 4:
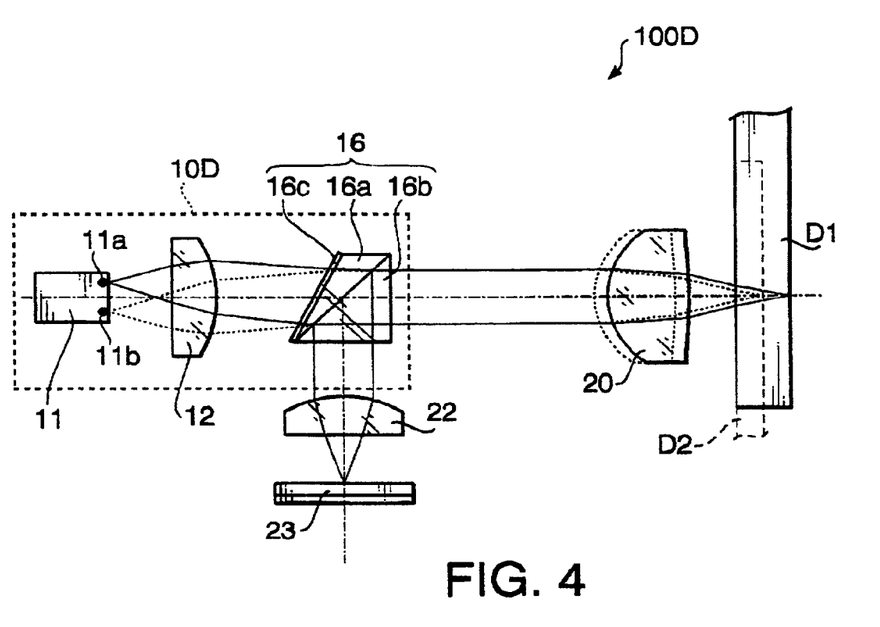
FIG. 4 schematically shows an optical system of an optical head employing a light source unit according to a fourth embodiment of the invention.

FIG. 4 shows a optical system 100D of an optical head including a light source unit 10D according to a fourth embodiment.

The optical system 100D includes the light source unit 10D, an objective lens 20, a collective lens 22 and a light receiving element 23. The light source unit 10D includes a laser diode 11 having multiple light emitting points, a collimating lens 12, an optical path compensation element 16. The optical path compensating element 16 is composed of cemented refraction prisms 16a and 16b, and a diffraction surface 16c formed on the light receiving surface of the prism 16a located on the light source unit side. The cemented surface of the prisms 16a and 16b are configured to serve as a beam splitting surface, which is inclined with respect to the optical axis of the objective lens by 45 degrees.

The laser beams emitted by the light emitting points 11a and 11b are collimated by the collimating lens 12, and are incident on the optical path compensating element 16. The optical path compensating element 16 bends the laser beams such that each of the beams proceeds in a direction parallel to the optical axis of the objective lens 20. Further, the optical paths of the beams emerging from the optical path compensation element 16 coincide with each other. Each of the laser beams emerging from the optical path compensation element 16 is incident on the objective lens 20, which converges the laser beams on the data recording surface of the first or second disc D1 or D2 to form a beam spot thereon. The beam reflected by the data recording surface passes through the objective lens 20, and proceeds as a parallel light beam toward the optical path compensation element 16. Part of the reflected light incident on the optical path compensation element 16 is reflected by the beam splitting surface thereof, and is incident on the light receiving element 23 through the collective lens 22.

According to the fourth embodiment, the optical paths of the laser beams having different wavelengths can be coincident with each other, thereby vignetting at the objective lens 20 and/or occurrence of aberrations can be suppressed. Further, two prisms 16a and 16b are cemented, and the cemented surface is configured to serve as the beam splitting surface. With this configuration, the optical axes of the collimating lens 12 and the objective lens 20 can be made coincide with each other. Therefore, arrangement of the lenses can be facilitated. Furthermore, since the beam splitting surface is inclined with respect to the optical axis of the objective lens 20 by 45 degrees, the collective lens 22 can be arranged such that the optical axis thereof is perpendicular to the optical axis of the objective lens 20. Thus, as in the third embodiment, the positioning of the collective lens 22 and the light receiving element 23 can be performed easily with reference to the optical axis of the objective lens 20.

Still further, in the fourth embodiment, the normal to the light emerging surface of the optical path compensation element 16 and the optical axis of the objective lens 20 are parallel to each other. Accordingly, positioning of the optical path compensation element 16 can also be performed easily with reference to the optical axis of the objective lens 20.

It should be stressed that, in the light source unit 10D, the light emitting points 11a and 11b of the laser diode 11 are arranged in the direction of the shorter axis of the cross section thereof. Specifically, an angle formed between the optical axis of the collimating lens 12 and the normal to the light receiving surface of the prism 16a is greater than the angle formed between the normal to the light emerging surface of the prism 16b and the optical axis of the objective lens 20. Therefore, when the light emitting points 11a and 11b are arranged such that the shorter axis of the cross section of each laser beam is parallel to the a line connecting the light emitting points 11a and 11b, the prisms 16a and 16b have a beam shaping function to convert the cross section of each beam form an elliptical shape to a circular shape.

Fifth Embodiment

Figure 5:
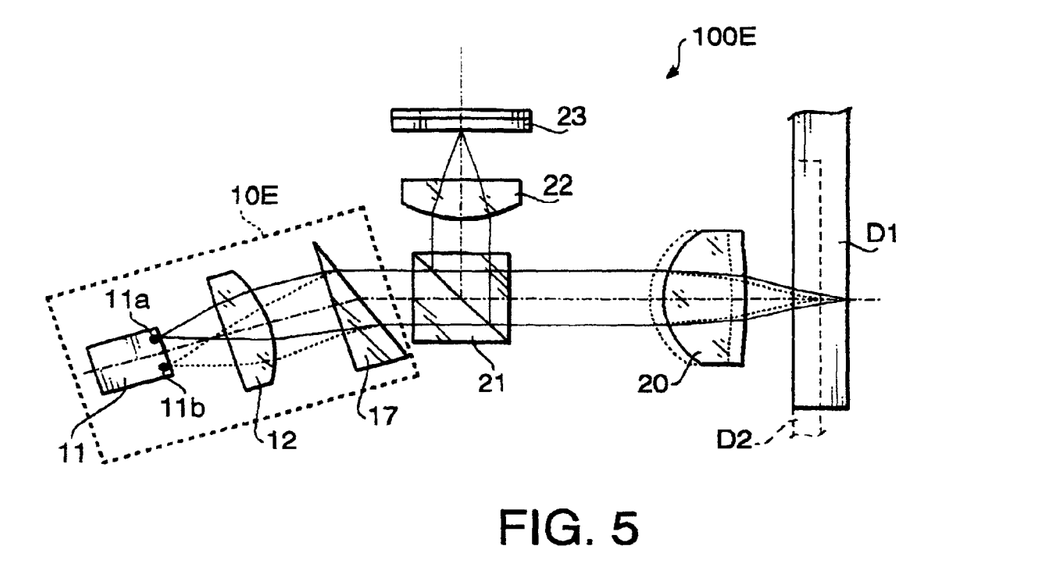
FIG. 5 schematically shows an optical system of an optical head employing a light source unit according to a fifth embodiment of the invention.

FIG. 5 shows a optical system 100E of an optical head including a light source unit 10E according to a fifth embodiment.

The optical system 100E includes the light source unit 10E, an objective lens 20, a beam splitter 21, a collective lens 22 and a light receiving element 23. The light source unit 10E includes a laser diode 11 having multiple light emitting points, a collimating lens 12, an optical path compensation element 17 consisting of a single refraction prism. A difference of the optical system 100E in comparison with the optical system 100A shown in FIG. 1 is that the optical path compensation element 17 consists of a single refraction prism, and due to this configuration, the optical axis of the collimating lens 12 is inclined with respect to the optical axis of the objective lens 20.

The laser beams emitted by the light emitting points 11a and 11b are collimated by the collimating lens 12, and are incident on the optical path compensating element 17. The optical path compensating element 17 bends the laser beams such that each of the beams proceeds in a direction parallel to the optical axis of the objective lens 20. Further, the optical paths of the beams emerging from the optical path compensation element 17 coincide with each other. Each of the laser beams emerging from the optical path compensation element 17 passes through the beam splitter 21 and is incident on the objective lens 20, which converges the laser beams on the data recording surface of the first or second disc D1 or D2 to form a beam spot thereon. The beam reflected by the data recording surface of the optical disc D1 or D2 passes through the objective lens 20, and proceeds as a parallel light beam toward the beam splitter 21. Part of the reflected light incident on the beam splitter 21 is reflected thereby and is incident on the light receiving element 23 through the collective lens 22.

As described above, according to the fifth embodiment, the optical path of the laser beams having different wavelengths can be coincident with each other, thereby vignetting at the objective lens 20 and/or occurrence of aberrations can be suppressed.

In the first through fourth embodiments, the optical axis of the collimating lens 12 and the optical axis of the objective lens 20 are parallel to each other. In this case, however, the structure of the optical path compensation element is relatively complicated since the diffraction surface should be provided. According to the fifth embodiment, since only the refraction prism is used as the optical path compensation element 17, the structure is simplified. Accordingly, although the arrangement of the optical elements is relatively complicated in the fifth embodiment, the manufacturing cost may be suppressed due to the simple structure of the optical path compensation element.

In the fifth embodiment, the light emitting points 11a and 11b are aligned in a direction of a longer axis of the elliptical cross section of each beam. Further, an angle formed between the optical axis of the collimating lens 12 and a normal to the light receiving surface of the optical path compensation element 17 is smaller than the angle formed between a normal to the light emerging surface of the optical path compensation element 17 and the optical axis of the objective lens 20, so that a beam shaping function is provided (i.e., the elliptical cross section of each laser beam is compensated to a circular shape).

Three exemplary designs of the optical path compensation element 17 according to the fifth embodiment will be indicated in TABLEs 8–10. In the TABLEs, an exit angle of the beams represents an angle formed between the beam emerging from the prism 17 and the normal to the light emerging surface of the prism.

TABLE 8

| | |
|---|---|
| wavelength λ1 of the beam emitted by the first light emitting point 11a | 785 nm |
| wavelength λ2 of the beam emitted by the second light emitting point 11b | 465 nm |
| distance between the light emitting points 11a and 11b | 0.100 mm |
| focal length of the collimating lens 12 | 5.73 mm |
| refractive indexes n(λ1) and n(λ2) of the prism 17 for wavelengths λ1 and λ2 | n(λ1) = 1.635 n(λ2) = 1.666 |
| apical angle of the prism 17 | 30.0000° |
| exit angle of the beams | 55.6094° |

TABLE 9

| | |
|---|---|
| wavelength λ1 of the beam emitted by the first light emitting point 11a | 785 nm |
| wavelength λ2 of the beam emitted by the second light emitting point 11b | 665 nm |
| distance between the light emitting points 11a and 11b | 0.100 mm |
| focal length of the collimating lens 12 | 8.35 mm |
| refractive indexes n(λ1) and n(λ2) of the prism 17 for wavelengths λ1 and λ2 | n(λ1) = 1.824 n(λ2) = 1.835 |
| apical angle of the prism 17 | 45.4516° |
| exit angle of the beams | 45.0000° |

TABLE 10

| | |
|---|---|
| wavelength λ1 of the beam emitted by the first light emitting point 11a | 785 nm |
| wavelength λ2 of the beam emitted by the second light emitting point 11b | 665 nm |
| distance between the light emitting points 11a and 11b | 0.100 mm |
| focal length of the collimating lens 12 | 8.14 mm |
| refractive indexes n(λ1) and n(λ2) of the prism 17 for wavelengths λ1 and λ2 | n(λ1) = 1.537 n(λ2) = 1.540 |
| apical angle of the prism 17 | 74.7790° |
| exit angle of the beams | 69.1000° |

It should be noted that, in accordance with the configuration indicated in TABLE 8, the optical path of each laser beam incident on the light receiving surface of the prism 17 is substantially perpendicular to the light receiving surface of the prism 17.

Sixth Embodiment

Figure 6:
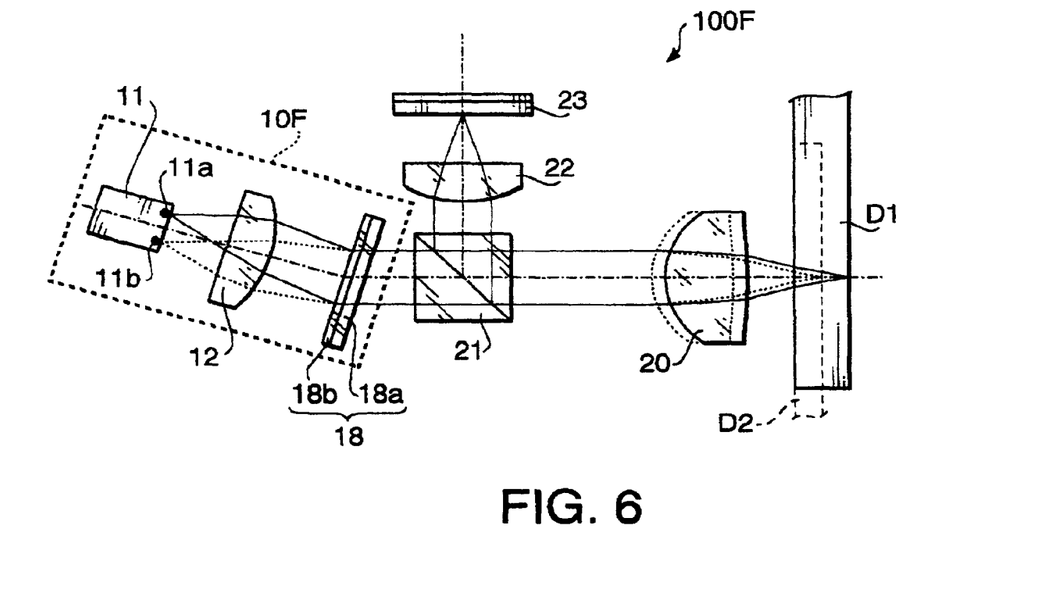
FIG. 6 schematically shows an optical system of an optical head employing a light source unit according to a sixth embodiment of the invention.

FIG. 6 shows a optical system 100F of an optical head including a light source unit 10F according to a sixth embodiment.

The optical system 100F includes the light source 10F, an objective lens 20, a beam splitter 21, a collective lens 22 and a light receiving element 23. The light source unit 10F includes a laser diode 11 having multiple light emitting points, a collimating lens 12, an optical path compensation element 18. A difference of the optical system 100F with respect the optical system shown in FIG. 1 is that the optical path compensation element 18 consists of a parallel plate 18a and a diffraction surface 18b, and the optical axis of the collimating lens 12 inclines with respect to the optical axis of the objective lens 20.

The laser beams emitted by the light emitting points 11a and 11b are collimated by the collimating lens 12, and are incident on the optical path compensating element 18. The optical path compensating element 18 bends the laser beams such that each of the beams proceeds in a direction parallel to the optical axis of the objective lens 20. Further, the optical paths of the beams emerging from the optical path compensation element 18 coincide with each other. Each of the laser beams emerging from the optical path compensation element 18 is incident on the objective lens 20, which converges the laser beams on the data recording surface of the first or second disc D1 or D2 to form a beam spot thereon. The beam reflected by the data recording surface passes through the objective lens, and proceeds as a parallel light beam toward the beam splitter 21. Part of the reflected light incident on the beam splitter 21 is reflected by the beam splitter 21, and is incident on the light receiving element 23 through the collective lens 22.

As described above, according to the sixth embodiment, the optical path of the laser beams having different wavelengths can be coincident with each other, thereby vignetting at the objective lens 20 and/or occurrence of aberrations can be suppressed. Further, since the optical path compensation element 18 is formed using the parallel plate, although the optical paths are bent, the structure thereof is simplified and a space for the optical path compensation element can be made relatively small.

Similarly to the first embodiment, the light emitting points 11a and 11b are aligned in a direction of a longer axis of the elliptical cross section of each beam. Further, an angle formed between the optical axis of the collimating lens 12 and a normal to the light receiving surface of the optical path compensation element 18 is smaller than the angle formed between a normal to the light emerging surface of the optical path compensation element 18 and a direction of the beams emerged therefrom so that a beam shaping function is provided (i.e., the elliptical cross section of each laser beam is compensated to a circular shape).

An exemplary design of the optical path compensation element 18 according to the sixth embodiment will be indicated in TABLE 11.

TABLE 11

| | |
|---|---|
| wavelength λ1 of the beam emitted by the first light emitting point 11a | 785 nm |
| wavelength λ2 of the beam emitted by the second light emitting point 11b | 660 nm |
| blazed wavelength λB for the diffraction surface 18b | 722 nm |
| distance between the light emitting points 11a and 11b | 0.100 mm |
| focal length of the collimating lens 12 | 8.00 mm |

TABLE 11-continued

| | |
|---|---|
| refractive indexes n(λ1), n(λ2) and n(λB) of the parallel plate 18a for wavelengths λ1, λ2 and λB | n(λ1) = 1.537<br>n(λ2) = 1.540<br>n(λB) = 1.538 |
| optical path difference coefficient P1 | 1.000 × 10² |
| inclination angle θ of the diffraction surface 18b | 0.0000° |

It should be noted that, in the optical system 100A, 100B, 100C, 100D and 100F, which employs a diffraction surface in the optical path compensation element, the beam reflected by the optical disc is directed to the light receiving element without passing through the diffraction surface. This is advantageous since the loss of light amount is relatively large if the laser beam passes through the diffraction surface twice. Configured as in the above embodiments, it is ensured that the light beam having sufficient light amount is incident on the light receiving element.

The present disclosure relates to the subject matter contained in Japanese Patent Application No.2000-284805, filed on Sept. 20, 2000, which is expressly incorporated herein by reference in its entirety.

What is claimed is:

1. A light source unit of an optical head for an optical disc drive, said light source unit selectively emitting one of a plurality of laser beams toward an objective lens of said optical head, said light source unit comprising:
   a laser diode having a plurality of light emitting points, said plurality of light emitting points spaced from each other by a predetermined minute amount, one of a plurality of laser beams having different wavelengths being selectively emitted from said plurality of light emitting points, respectively;
   a collimating lens that collimates each of the plurality of laser beams respectively emitted from said plurality of light emitting points, said plurality of laser beams passed through said collimating lens proceeding in different directions; and
   a transparent optical path compensation element having a predetermined dispersion characteristic, said optical path compensation element receiving each of said plurality of laser beams emerging from said collimating lens, each of the plurality of laser beams received by said optical path compensation element passing through and emerging from said optical path compensation element in a direction substantially parallel with the optical axis of said objective lens, said optical path compensation element reducing an angle formed between the optical paths of said plurality of laser beams.

2. The light source unit according to claim 1, wherein an angle between the optical paths of said plurality of laser beams passed through said optical path compensation element is substantially zero.

3. The light source unit according to claim 1, wherein the optical paths of said plurality of laser beams passed through said optical path compensation element substantially coincide with each other.

4. The light source unit according to claim 3, wherein a light emerging side focal point of said collimating lens is substantially on a light emerging surface of said optical path compensation element.

5. The light source unit according to claim 1, wherein said optical path compensation element includes at least one optical element, a diffraction surface being formed on one of a light receiving surface and a light emerging surface of said at least one optical element.

6. The light source unit according to claim 5, wherein said diffraction surface is represented by an optical path difference function $\phi(y)$:

$$\phi(y)=P_1 y$$

where,
   y represents a coordinate perpendicular to the optical axis, and measured along a direction in which said plurality of light emitting points are aligned, and
   $P^1$ is a coefficient for a first order term of the optical path difference function.

7. The light source unit according to claim 6, wherein said diffraction surface is formed to satisfy the following relationship:

$$P1 \cdot \lambda B/\{n(\lambda B)-1\}+\sin\theta \leq 0 \text{ where,}$$

λB is a blazed wavelength measured by millimeter,
n(λB) is a refractive index for wavelength λB, and
θ represents an inclination angle of the diffraction surface.

8. The light source unit according to claim 5, wherein said at least one optical element is a transparent parallel plate.

9. The light source unit according to claim 8, wherein said plurality of light emitting points are arranged to be aligned along a line, a longer axis of a cross section of each of said plurality of laser beams being substantially parallel with said line, and wherein an angle formed between an optical axis of said collimating lens and a normal to a light receiving surface of said parallel plate is smaller than an angle formed between a normal to a light emerging surface of said parallel plate and an optical axis of the objective lens.

10. The light source unit according to claim 5, wherein said at least one optical element comprising at least one prism.

11. The light source unit according to claim 10, wherein said plurality of light emitting points and said at least one prism are arranged such that an elliptical cross section of each of the laser beams emitted from said plurality of light emitting points is shaped to be a substantially circular cross section by said at least one prism.

12. The light source unit according to claim 11,
   wherein said plurality of light emitting points are arranged such that said plurality of laser beams are aligned along the longer axes of the cross section of said plurality of laser beams, and
   wherein an angle formed between an optical axis of said collimating lens and a normal to a light receiving surface of said at least one prism is smaller than an angle formed between a normal to a light emerging surface of said at least one prism and an optical axis of the objective lens.

13. The light source unit according to claim 11,
   wherein said plurality of light emitting points are arranged such that said plurality of laser beams are aligned along the shorter axes of the cross section of said plurality of laser beams, and
   wherein an angle formed between an optical axis of said collimating lens and a normal to a light receiving surface of said at least one prism is greater than an angle formed between a normal to a light emerging surface of said at least one prism and an optical axis of the objective lens.

14. The light source unit according to claim 10, wherein at least one of an angle formed between an optical axis of said collimating lens and a normal to a light receiving surface of said at least one prism and an angle formed between a normal to a light emerging surface of said at least one prism and an optical axis of the objective lens is substantially zero.

15. The light source unit according to claim 1, wherein said optical path compensation element comprises:
   a single prism element;
   a diffraction surface formed on a light receiving surface of said prism element;
   a beam splitting surface formed on a light emerging surface of said prism element, said beam splitting surface allows beams passed through said prism element to pass through and reflects at least a part of light beam reflected by the optical disc toward the light receiving element for data readout, said beam splitting surface being inclined with respect to the optical axis of the objective lens, each of the plurality of laser beams emerging from said light emerging surface of said prism element being parallel with the optical axis of the objective lens.

16. The light source unit according to claim 1, wherein said optical path compensation element comprises:
   a cemented prism consisting of a pair of prism elements cemented to each other;
   a diffraction surface formed on a light receiving surface of said cemented prism;
   a beam splitting surface formed on a cemented surface of said cemented prism, said beam splitting surface allows beams passed through said prism element to pass through and reflects at least a part of light beam reflected by the optical disc toward the light receiving element for data readout, said beam splitting surface being inclined with respect to the optical axis of the objective lens, each of the plurality of laser beams emerging from said light emerging surface of said cemented prism being parallel with the optical axis of the objective lens.

17. The light source unit according to claim 1, wherein said optical path compensation element consists of a single prism element.

18. The light source unit according to claim 17, wherein said plurality of light emitting points and said prism element are arranged such that an elliptical cross section of each of the laser beams emitted from said plurality of light emitting points is shaped to be a substantially circular cross section by said prism element.

19. The light source unit according to claim 18,
   wherein said plurality of light emitting points are arranged such that said plurality of laser beams are aligned along the longer axes of the cross section of said plurality of laser beams, and
   wherein an angle formed between an optical axis of said collimating lens and a normal to a light receiving surface of said prism element is smaller than an angle formed between a normal to a light emerging surface of said prism element and an optical axis of the objective lens.

20. The light source unit according to claim 17, wherein an angle formed between an optical axis of said collimating lens and a normal to a light receiving surface of said at least one prism is substantially zero.

21. A light source unit of an optical head for an optical disc drive, comprising:
   a laser diode having a plurality of light emitting points, said plurality of light emitting points spaced from each other by a predetermined amount, one of a plurality of laser beams having different wavelengths being selectively emitted from said plurality of light emitting points, respectively;
   a collimating lens that collimates each of the plurality of laser beams respectively emitted from said plurality of light emitting points, said plurality of laser beams passed through said collimating lens proceeding in different directions; and
   a transparent optical path compensation element having a predetermined dispersion characteristic so that each of said plurality of laser beams emerging from said collimating lens is emerged from said transparent optical path compensation element along the same optical path.

22. The light source unit according to claim 21, each of said plurality of laser beams respectively emitted from said plurality of light emitting points having an elliptical cross section, each of said plurality of laser beam emerging from said optical path compensation element having a circular cross section.

23. The light source unit according to claim 21,
   wherein said optical head includes an objective lens, each of said plurality of laser beams emerging from said optical path compensation element being incident on an optical disc through the objective lens, each of said plurality of laser beams reflected by the optical disc being directed toward said optical path compensation element, and
   wherein said optical path compensation element includes a beam splitting surface that reflects the laser beam reflected by the optical disc and passed through the objective lens to proceed along an optical path extending in a direction different from said same optical path.

* * * * *